United States Patent [19]
Shteyngarts

[11] Patent Number: 5,897,322
[45] Date of Patent: Apr. 27, 1999

[54] PAINTING APPARATUS

[75] Inventor: Gregory A. Shteyngarts, Solon, Ohio

[73] Assignee: Victory Craft, Inc., Cleveland, Ohio

[21] Appl. No.: 08/965,270

[22] Filed: Nov. 6, 1997

[51] Int. Cl.⁶ .................................................. G09B 11/10
[52] U.S. Cl. .............................................. 434/84; 434/98
[58] Field of Search ................................ 434/84, 81, 98, 434/89; 472/72; 428/13, 14

[56] References Cited

U.S. PATENT DOCUMENTS

| | | | |
|---|---|---|---|
| 249,676 | 11/1881 | Ripley . | |
| 634,851 | 10/1899 | Lindemann . | |
| 1,506,677 | 8/1924 | Shipton et al. . | |
| 1,881,417 | 10/1932 | Hodgkin . | |
| 2,254,462 | 9/1941 | Weiser | 41/21 |
| 2,328,523 | 8/1943 | Bauer | 36/34 |
| 2,511,552 | 6/1950 | Stuempges | 41/35 |
| 2,636,301 | 4/1953 | Wilmsen | 41/24 |
| 2,876,574 | 3/1959 | Powell | 434/84 |
| 3,040,447 | 6/1962 | Baldanza | 35/26 |
| 3,057,097 | 10/1962 | Douglas | 41/24 |
| 3,287,193 | 11/1966 | Kein | 156/59 |
| 5,072,460 | 12/1991 | Weder | 2/206 |

FOREIGN PATENT DOCUMENTS 2130979 of 0000 France .

*Primary Examiner*—Kien T. Nguyen
*Attorney, Agent, or Firm*—D. Peter Hochberg

[57] ABSTRACT

A painting support comprised of a three-dimensional transparent plastic body that is a molded replica of an object. The interior surface of the mold contains a variety of areas with different surface textures that represent different colors. The different textures are designed to accept different colors of paints. A key code directs a person to paint the areas in specified steps and in certain colors.

8 Claims, 2 Drawing Sheets

PAINTING APPARATUS

BACKGROUND OF THE INVENTION

1. Field of Invention

The invention relates generally to the painting of objects and more particularly to an easy to use plastic support to which paint can be applied by young children.

2. Description of the Prior Art

Painting by numbers on paper and painting transparent plastic or glass three-dimensional objects or molds have been around for some time. Painting by numbers can include one or many objects and can include a small amount or large amount of numbers and colors. Painting by numbers may be cumbersome and difficult for very young children. The more objects included in the painting and the more numbers involved determine whether or not it is appropriate for some young children to undertake. When three-dimensional objects increase in complexity, the cost increases, and the teaching quality for young children diminishes. In both these cases, the objects require that paint be applied to the front exterior surface, and the durability of the painted surface is dependent on the type of paint applied, and may or may not be resistant to chipping or scratching.

U.S. Pat. No. 3,287,193 discloses a method of reproducing a textural surface painting. This allows an unskilled person to duplicate brush strokes, pallet knife marks, paint buildup and three-dimensional thickness of an oil painting. Numbers are printed on the material for indicating which color of paint to be applied to different areas of texture for matching the colors of the original oil painting. A mold or matching die halves are formed by conventional means from an original oil painting. The painting in this disclosure is painted on the exterior of the molded material. These numbers and the abundancy of these numbers would be too complex for young children.

U.S. Pat. No. 5,072,460 discusses a method for forming a mask out of paper, foil or processed organic polymer films. The mask is three-dimensional and teaches that a decorative pattern may be applied to the inner and/or outer surface to contribute to the ornamental appearance of the mask. The mask does not include numbers for coloring nor teach different objects besides that of a mask. Therefore, a child would have difficulty selecting an appropriate color for each part of the mask.

U.S. Pat. No. 3,057,097 provides for the creation of a clear or opaque molded plastic sheet to simulate a wooden frame and having embossed within such frame the outline and component of a conventional three-dimensional figure. Numbers are silk screened on the interior of the plastic in case of opaque molds. In the case of clear molds, a sheet of paper can be put behind the picture with numbers for painting. This patent is another form of molded plastic where paint is applied to the exterior and numbers are used to specify colors.

U.S. Pat. No. 3,040,447 is another painting by numbers device for three-dimensional objects such as plaques, figurines, statuettes and the like utilizing transparent shells. The picture or plaques can be a flat surface or a three-dimensional embossed surface. Again, paint is applied to the exterior and the numbers are imprinted on the interior part of the shell.

There is currently no easy-to-use three-dimensional clear plastic apparatus on the with coloring instructions for paint which could easily be followed by a child. Further, there is no easy-to-use clear plastic paint apparatus that, when completed, looks as though a skilled artist has painted it. In addition, there is currently no product that looks as though a skilled person painted it and which can be used to create plaques and wall hangings at extremely low costs because of relatively low die costs and production costs.

Accordingly, there is a need for a painting apparatus for three-dimensional supports that is inexpensive and simple to use. There is also a need for children's painting apparatus that can teach children to decorate three-dimensional objects. Additionally there is a need for a children's painting apparatus that will create a decorative object having a glossy finish regardless of the type of paint used.

SUMMARY OF THE INVENTION

The invention is an entertainment and teaching apparatus for children comprised of a three-dimensional transparent plastic body molded to portray some object and could be a replica of almost any object. Such objects could be animals, vehicles, cartoons, school subjects, famous places and the like. The apparatus comprises a body or support having an exterior and an interior surface. The interior surface includes numerous areas that contain different surface textures, where each surface texture indicates that a different color to be painted on the respective surfaces. The various areas accept paint from a paintbrush or the like used by a child. The teaching apparatus could include an instruction sheet that contains a pictorial view of assigned steps and colors of paint to be applied to the areas of differing surface textures. The use of textured surfaces as opposed to following the numbers allows for children who cannot read numbers to follow the simple instructions. The textured surface further helps the surface to retain the paint in place. Using replicas of objects teaches the child the different objects and colors associated with these objects. Also because the exterior is clear and unpainted the finished painting has a clear lucid look that is scratch and chip resistant regardless of the type of paint used.

An object of the present invention is to provide an inexpensive transparent or translucent painting surface for children.

Another object of the present invention is to provide a children's teaching apparatus that is simple for children of all ages to use.

A further object of the present invention is to provide a teaching apparatus for children that is in the form of a replica of an object such as animals, vehicles, cartoons, school subjects, famous places and the like, to assist the child in learning different objects and different colors associated with those objects.

It is yet a further object of the invention to provide a painting apparatus that has an exterior surface that is always glossy and resistant to scratching and chipping regardless of the paint utilized.

These and other objects will become apparent from the following description of a preferred embodiment taken together with the accompanying drawings and the appended claims.

BRIEF DESCRIPTION OF THE DRAWINGS

The invention may take physical form in certain parts and arrangement of parts, preferred embodiment of which will be described in detail in the specification and illustrated in the accompanying drawings which form a part hereof, and wherein.

DETAILED DESCRIPTION OF THE PREFERRED EMBODIMENT

Figure 1:
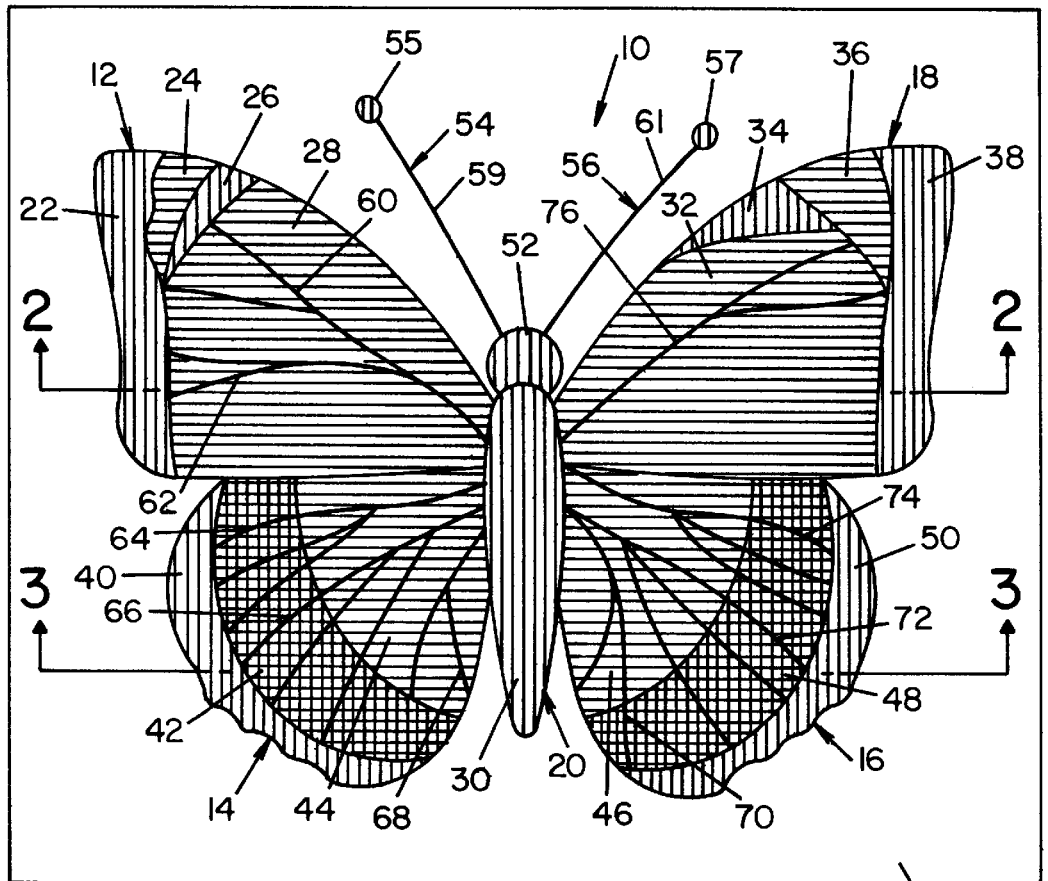
FIG. 1 is a rear elevational view of an embodiment of the invention in the form of a butterfly.
Figure 2:
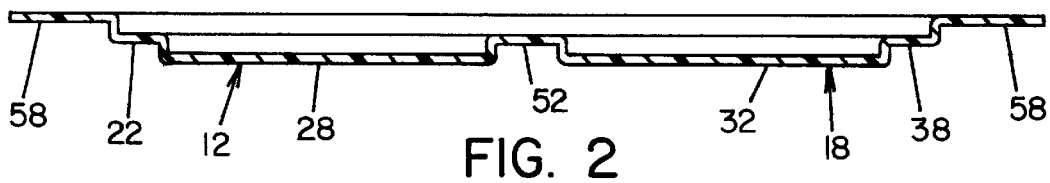
FIG. 2 is a section taken on line 2—2 in FIG. 1.
Figure 3:
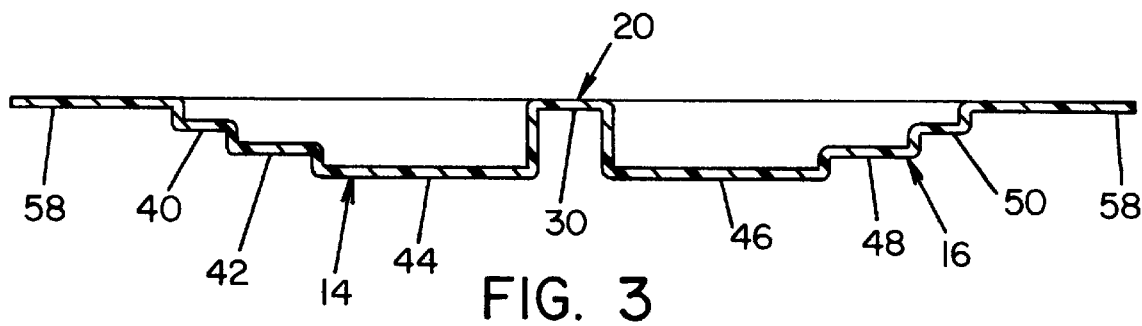
FIG. 3 is a section taken on line 3—3 in FIG. 1.

Referring now to the drawings wherein the showings are for the purpose of illustrating the preferred embodiments of the invention only, and not for purpose of limiting same, FIGS. 1–3 show the invention in one of its preferred forms. Referring now to FIG. 1, the embodiment is a three-dimensional replica of a butterfly 10 consisting of four wing sections 12, 14, 16, 18, a body 20 including a torso 30, a head 52 and two antennae 54, 56. The upper left wing section 12 is divided into 4 areas 22, 24, 26, 28 of differing interior surface textures. Heavy lines 60, 62 are also engraved onto the wing section. Upper right wing section 18 is also divided into 4 sections 32, 34, 36, 38 also having differing interior surface textures with a heavy line 76 embossed onto the wing. The lower left wing section 14 and the lower right wing section 16 are both divided into 3 areas of differing interior surface textures respectively, 40, 42, 44 and 46, 48, 50, the areas including heavy lines 64, 66, 68 and 70, 72 and 74, respectively. The body 20 of the butterfly consists of a torso 30, a head 52 and two antennae 54, 56. The antennae 54, 56 consist of two heavy lines 59, 61 and two circular portions 55, 57. Each of the heavy lines 59, 61 extend from the head 52 to one of the two circular portions 55, 57. The example also includes a flat portion 58 that would allow one to hang it on a wall or another area such as the outside wall of a refrigerator after painting has been completed.

FIG. 2 shows a section drawn along line 2—2 of FIG. 1. As can be seen from the figure the upper wing sections 12, 18 are raised above the flat surface 58. The wing areas 28, 32 are at the same height and raised above the other wing areas 22, 38.

FIG. 3 shows a section drawn along the line 3—3 of FIG. 1. As can be seen from this figure, the lower wing sections 14, 16 are raised above the flat surface 58 of the embodiment while torso 30 of the body 30 lies along the same plane as the flat surface 58. Wing areas 44, 46 are raised to the same height as one another and above wing areas 42, 48 which are also at the same height as each other. Wing areas 42, 48 are raised above wing areas 40, 50, which are at the same height as one another.

Figure 4:
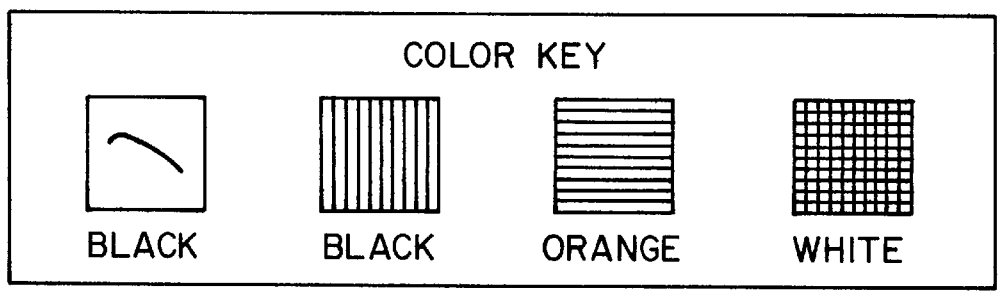
FIG. 4 is an example of a color key used with the preferred embodiment.

Referring now to the use of the embodiment, FIG. 4 is a color key that associates each texture with a color. The textures can be lines, dots, geometrical shapes or any other distinguishing texture. In this example, the textures are horizontal lines, vertical lines and a combination of horizontal and vertical lines. A child should follow the color key and match each color with its corresponding texture when painting the interior surface of the support. For example, the first thing to be painted will be all the heavy lines 60, 62, 64, 66, 68, 70, 72, 74, 76, found in the wings and including the antennae 54, 56. The child should look to the key in FIG. 4 and see that these lines should be black. Once the lines have been painted, the child should again look to the color key and determine that the next step will be to paint all areas with vertical textured lines black. These areas will include the torso 20, the head 52, and the circular portion of the antennae 55, 57. This should also include area 22 and 26 of upper left wing portion 12, areas 34, 38 of upper right wing portion 18, area 40 of lower left wing portion 14 and area 50 of lower right wing portion 16.

The child should then allow the paint to dry, clean the brush then begin on the next color. Looking to the key again, the child can determine that all horizontal textured lines are to be painted orange. The child should then proceed to paint wing areas 24 and 28 of wing portion 12, wing areas 32, 36 or wing portion 18, wing areas 44, 46 of wing portions 14, 16, respectively.

Once the paint has dried and the brush has been cleaned, the child can begin on the last color of the key. The child can determine now that wing area 42 and wing area 48, respectively, of lower wing sections 14, 16 should be painted white.

The butterfly painting has now been completed and once it dries the back can be painted any color, such as blue or green, to give the flat part 58 a background color. The completed painting can be put on a wall or other support. The child has learned about colors, butterflies, textures, painting, patience and diligence.

Although this example was very simple, the support can also be complex. This allows people of all ages to find a support whose complexity fits their needs. The mold may contain an object that is very detailed in nature. Landmarks such as the Statute of Liberty, Mount Rushmore, Niagara Falls, the Grand Canyon, detailed churches or synagogues, city landscapes, mountains, rivers, circus and zoo animals and many other detailed molds can be created. Regardless of the complexity, as long as one follows the easy to use key code, a finished product can be produced that would appear to have been painted by a skilled painter. The product would always have a glossy smooth professional exterior.

The support itself is preferably made by a thermoform process in which the plastic sheet is healed over a mold form, and the sheet is softened and allowed to conform to the shape of the mold form. The textured surfaces could be engraved in the mold form or could be added after the plastic has hardened by conventional methods such as machining, sand blasting or by use of chemical reactions.

The foregoing description is a specific embodiment of the present invention. It should be appreciated that this embodiment is described for the purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A transparent painting support comprising:

a three-dimensional transparent body molded into a replica of a predetermined object, said body having an exterior surface and an interior surface, said interior surface including a plurality of areas each containing a different surface textured pattern type wherein each surface textured pattern type represents a different color to be painted, said areas accepting paint of different colors.

2. The transparent painting support of claim 1, wherein the textured pattern types are molded into the body.

3. The transparent painting support of claim 1, wherein the textured pattern types comprise machined surfaces.

4. The transparent painting support of claim 1, wherein the textured pattern types comprise sandblasted surfaces.

5. The transparent painting support of claim 1, wherein each of said textured pattern types comprise a coating of material having a different physical texture than said transparent body.

6. The transparent painting support of claim 1, and further including a key code, said key code including all of said textured pattern types in said transparent body and a corresponding assigned color for each of said textured pattern types.

7. The transparent painting support of claim 6, and further comprising a flat portion surrounding said transparent body wherein said key code is embossed on the flat portion of the transparent painting support.

8. The transparent painting support of claim 6, wherein said key code is provided on a separate sheet of paper.

* * * * *